A. C. MEANS.
DRILL COLLAR.
APPLICATION FILED SEPT. 2, 1913.

1,121,386.

Patented Dec. 15, 1914.

WITNESSES
E. M. Callaghan
C. E. Trainor

INVENTOR
ABLE C. MEANS,
BY Munn & Co.
ATTORNEYS

UNITED STATES PATENT OFFICE.

ABLE C. MEANS, OF CLEMVILLE, TEXAS.

DRILL-COLLAR.

1,121,386.

Specification of Letters Patent.

Patented Dec. 15, 1914.

Application filed September 2, 1913. Serial No. 787,638.

*To all whom it may concern:*

Be it known that I, ABLE C. MEANS, a citizen of the United States, and a resident of Clemville, in the county of Matagorda and State of Texas, have made certain new and useful Improvements in Drill-Collars, of which the following is a specification.

My invention is an improvement in drill collars, and has for its object to provide a collar of the character specified, especially adapted for connecting a drill shank to the pipe, wherein means is provided for preventing sand, rock or the like, from working down in between the collar, and the drill stem, and into the threads on the stem, thus damaging the said thread, and causing the drill stem to jam or become locked in the collar.

Figure 1:
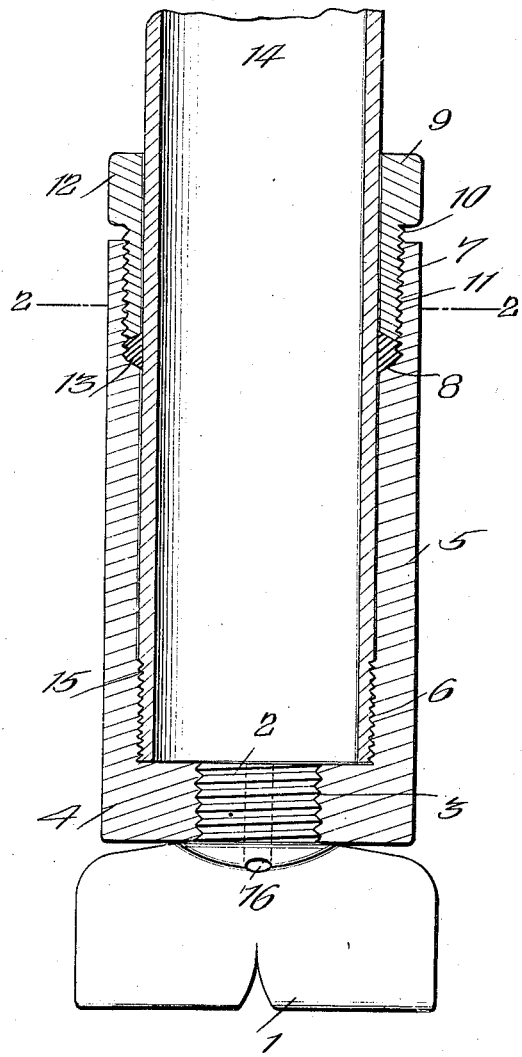
Figure 2:
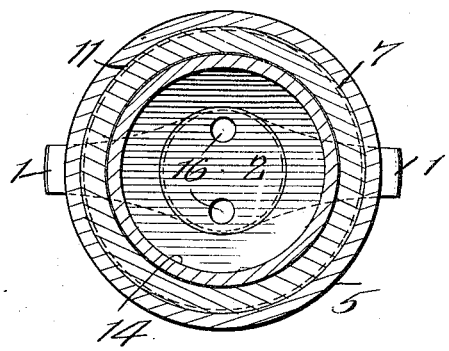
Figure 3:
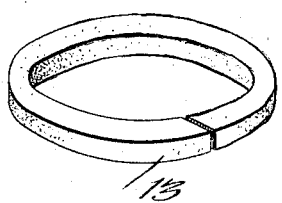

In the drawings: Figure 1 is a vertical section through the collar, Fig. 2 is a section on the line 2—2 of Fig. 1, and Fig. 3 is a perspective view of the packing ring.

In the present embodiment of the invention the drill or bit 1, is provided with a reduced screw threaded stem 2, and the said stem is engaged with a threaded opening 3 in the main or body portion 5 of the drill collar. The said main or body portion of the collar is cylindrical, and at its lower end the said section is provided with a diaphragm 4, having the central threaded opening 3. Just above the diaphragm the main or body section of the collar is internally threaded, as indicated at 6, and the upper end of the said main or body section of the collar is internally enlarged and internally threaded, as shown at 7.

A shoulder or annular rib 8 is provided between the enlarged internally threaded portion 7 and the remaining portion of the bore of the said section of the collar, and the said rib or shoulder is beveled, inclining inwardly and downwardly. The other or auxiliary section of the collar is in the form of a packing nut 9, the said nut being externally threaded, as indicated at 10, to engage the threaded portion 7 of the main or body section of the collar, and the inner end of the said nut is beveled in the opposite direction to the bevel of the rib or shoulder 8, as indicated at 11. The upper end of the packing nut is provided with an annular external rib 12, for engagement by a suitable tool, to rotate the packing nut.

A packing in the form of a split ring 13 is arranged between the shoulder 8 and the inner end of the packing nut, and it will be evident that when the packing nut is turned in a direction to cause the same to move toward the collar, the packing will be compressed and will be expanded inwardly and into close contact with the pipe 14 which is connected to the drill collar, to support the drill. The said pipe 14 is externally threaded at its lower end, as indicated at 15, to engage the threaded portion 6 of the collar.

The drill shank is provided with the usual openings 16, and if desired, a metal packing ring may be arranged above the packing 13. When the packing 13 is compressed at the packing nut, between the shoulder 8 and the nut, it will be expanded inwardly, into close contact with the outer surface of the pipe 14, thus forming a tight joint, so that sand and the like cannot work downwardly beyond the said packing. When it is desired to release the drill from the pipe or stem 14, the packing nut 9 is first removed, after which the pipe or stem may be unthreaded from the collar 5.

As is known, drills of the character in question are used for cutting a passage for the casing in oil wells, and the like, and since the said drill works in stone, the stone is very liable to creep down between the collar and the pipe and to injure the threads of the drill stem, thus jamming or blocking the stem, so that it cannot be released from the collar.

I claim:

1. The combination with a drill and a stem and a collar for connecting the drill to the stem, the collar encircling the stem, of means for sealing the space between the stem and the collar, said means comprising a packing encircling the stem between the collar and the stem, the collar being internally and annularly enlarged at its upper end for receiving the packing and being internally threaded above the packing, and a packing nut encircling the stem and threaded into the threaded portion of the collar and engaging the packing to compress the same.

2. The combination with a drill and a stem, and a collar for connecting the drill to the stem, the collar encircling the stem, of means for sealing the space between the stem and the collar, said means comprising a packing encircling the stem between the collar and the stem, and means for engaging the collar for compressing the packing to expand the same to fill the space between the collar and the stem.

ABLE C. MEANS.

Witnesses:
Thos. J. Poole,
J. R. Cookenboo.